US012418973B2

(12) United States Patent
Kirtley et al.

(10) Patent No.: US 12,418,973 B2
(45) Date of Patent: Sep. 16, 2025

(54) APPARATUS AND METHODS FOR GENERATING A PULSATING, HIGH-STRENGTH MAGNETIC FIELD

(71) Applicant: Helion Energy, Inc., Everett, WA (US)

(72) Inventors: David Kirtley, Seattle, WA (US); Richard Milroy, Sammamish, WA (US); Anthony Pancotti, Kenmore, WA (US); Christopher James Pihl, Woodinville, WA (US); George Votroubek, Monroe, WA (US)

(73) Assignee: Helion Energy, Inc., Everett, WA (US)

( * ) Notice: Subject to any disclaimer, the term of this patent is extended or adjusted under 35 U.S.C. 154(b) by 104 days.

(21) Appl. No.: 18/528,349

(22) Filed: Dec. 4, 2023

(65) Prior Publication Data

US 2024/0107652 A1 Mar. 28, 2024

Related U.S. Application Data

(63) Continuation of application No. PCT/US2022/032276, filed on Jun. 3, 2022.

(60) Provisional application No. 63/196,474, filed on Jun. 3, 2021.

(51) Int. Cl.
*H05H 1/14* (2006.01)

(52) U.S. Cl.
CPC .................................... *H05H 1/14* (2013.01)

(58) Field of Classification Search
CPC .. H05H 1/02; H05H 1/10; H05H 1/12; H05H 1/14; G21B 1/05
See application file for complete search history.

(56) References Cited

U.S. PATENT DOCUMENTS

| | | | | |
|---|---|---|---|---|
| 4,229,679 | A | 10/1980 | Lode | |
| 4,363,776 | A | 12/1982 | Yamada et al. | |
| 9,741,457 | B2 | 8/2017 | Slough | |
| 11,049,620 | B2 | 6/2021 | Slough | |
| 11,856,683 | B2 * | 12/2023 | Weinfeld | H05H 1/16 |
| 2010/0020913 | A1 * | 1/2010 | Mozgovoy | G21B 1/052 376/133 |
| 2011/0293056 | A1 * | 12/2011 | Slough | H05H 1/02 376/121 |
| 2011/0309050 | A1 | 12/2011 | Iori et al. | |
| 2012/0027151 | A1 * | 2/2012 | Bystriskii | H05H 1/46 376/127 |

(Continued)

FOREIGN PATENT DOCUMENTS

| | | | |
|---|---|---|---|
| AU | 2014248145 | B2 | 3/2018 |
| CA | 2854823 | A1 | 8/2013 |

(Continued)

OTHER PUBLICATIONS

Burnett, et al. Reference Theta Pinch Reactor (RTPR): A Study of a Pulsed High-Beta Fusion Reactor Based on the Theta Pinch. No. LA-5121. Los Alamos National Lab.(LANL), Los Alamos, NM, 1972, 39 pages.

(Continued)

*Primary Examiner* — Jason M Crawford
(74) *Attorney, Agent, or Firm* — Smith Baluch LLP

(57) ABSTRACT

A magnetic field system is configured to generate intense, dynamically-varying magnetic fields to confine and control particles, objects, or plasmas. The magnetic fields may pulsate to impart and directly extract energy from a plasma.

25 Claims, 5 Drawing Sheets

(56) References Cited

U.S. PATENT DOCUMENTS

| | | | | |
|---|---|---|---|---|
| 2017/0011811 | A1 | 1/2017 | Slough et al. | |
| 2018/0047461 | A1* | 2/2018 | Cohen | F03H 1/0081 |
| 2019/0141827 | A1* | 5/2019 | Gonzalez | H05H 1/22 |
| 2021/0335507 | A1 | 10/2021 | Tsiper | |
| 2022/0400546 | A1* | 12/2022 | Gota | G21B 1/052 |
| 2023/0069516 | A1* | 3/2023 | Forest | G21B 1/05 |
| 2023/0128652 | A1* | 4/2023 | Weinfeld | H05H 1/06 315/111.71 |
| 2023/0403779 | A1* | 12/2023 | Tkachev | H05H 1/14 |
| 2024/0107652 | A1* | 3/2024 | Kirtley | G21B 1/05 |
| 2024/0161963 | A1* | 5/2024 | Campbell | H01F 27/266 |

FOREIGN PATENT DOCUMENTS

| | | | |
|---|---|---|---|
| EP | 2396792 | B2 | 12/2011 |
| EP | 3002761 | B1 | 4/2016 |
| WO | 2010093981 | A2 | 8/2010 |
| WO | 2012021537 | A1 | 2/2012 |
| WO | 2013112221 | A3 | 8/2013 |
| WO | 2019165535 | A1 | 9/2019 |

OTHER PUBLICATIONS

Hoffman, Field Reversed Configurations (and Rotating Magnetic Field Current Drive), (2006), 101 pages.

International Search Report in International Application No. PCT/US2022/032276 mailed Aug. 18, 2022, 8 pages.

Johansson, "Direct conversion of fusion energy." (2003), Alfven Labs, 73 pages.

Nakashima et al., "Plasma energy recovery by using pickup coil system from a D3He inertial confinement fusion reactor." Fusion Engineering and Design 15.3 (1991): 255-262.

Oliphant et al. "Direct conversion of thermonuclear plasma energy by high magnetic compression and expansion." Nuclear Fusion 13.4 (1973): 529, 5 pages.

Post, "Experimental Base of Mirror-Confinement Physics." Fusion Part A: Magnetic confinement Part A 432 (2012): 357, 86 pages.

Slough, et al. "Creation of a high-temperature plasma through merging and compression of supersonic field reversed configuration plasmoids." Nuclear Fusion 51.5 (2011): 053008, 18 pages.

Steinhauer, Loren C. "Review of field-reversed configurations." Physics of Plasmas 18.7 (2011), 38 pages.

Tsiper, "Feasibility of Net Energy Gain in Kinematic Nuclear Fusion Devices." arXiv preprint arXiv:2005.12849 (2020), 4 pages.

Tuszewski, "Field reversed configurations." Nuclear Fusion 28.11 (1988): 008, 60 pages.

Extended European Search Report in European App. No.22816979.3 dated Apr. 1, 2025, 9 pages.

Taccetti et al: "FRX-L: A field-reversed configuration plasma injector for magnetized target fusion", Review of Scientific Instruments, American Institute of Physics, 2 Huntington Quadrangle, Melville, NY 11747, vol. 74, No. 10, Oct. 1, 2003 (Oct. 1, 2003), pp. 4314-4323, XP012040440, ISSN: 0034-6748, DOI: 10.1063/1.1606534, 10 pages.

* cited by examiner

APPARATUS AND METHODS FOR GENERATING A PULSATING, HIGH-STRENGTH MAGNETIC FIELD

CROSS-REFERENCE TO RELATED APPLICATIONS

The present application is a bypass continuation of International Application No. PCT/US2022/032276, filed on Jun. 3, 2022, and entitled "Apparatus and Methods for Generating a Pulsating, High-Strength Magnetic Field," which in turn claims the priority benefit, under 35 U.S.C. § 119(e), of U.S. Application Ser. No. 63/196,474, filed on Jun. 3, 2021, and entitled "Apparatus and Methods for Generating a Pulsating, High-Strength Magnetic Field." Each of these applications is incorporated herein by reference in its entirety for all purposes.

BACKGROUND

Intense magnetic fields may be generated with a plurality of current-carrying coils that are driven with large electrical currents and high voltages. Such magnetic fields may be used to confine high-energy particles and/or to accelerate particles or objects to high velocities. In some cases, intense magnetic fields may be used to confine a plasma.

SUMMARY

The described implementations relate to methods and apparatus for dynamically controlling particles, objects, and/or plasmas contained within intense magnetic fields. The magnetic fields may be produced with an assembly of magnetic coils that are controlled to impart energy to the contained particles, objects, or plasmas. In some cases, the magnetic coils may be controlled to directly extract energy from the particles or plasmas. For repeated energy exchange with a plasma (e.g., delivery of energy to and extraction of energy from the plasma), at least a portion of the magnetic field produced by the magnetic coils may be varied spatially and temporally to pulsate the plasma.

Some implementations relate to a methods of confining an energetic plasma. Such methods can include acts of: injecting the plasma into a container; applying a first plurality of currents to a plurality of magnetic coils that are arranged to create a magnetic field within the container, wherein the magnetic field prepares the plasma in a first state, wherein a radius of a separatrix of the plasma in the first state has a first radial value and a length of the separatrix has a first length value when the plasma is in the first state; applying a second plurality of currents to the plurality of magnetic coils that changes the magnetic field to transition the plasma from the first state to a second state, wherein the radius of the separatrix has a second radial value in the second state that is less than the first radial value and the separatrix has a second length value in the second state; and applying a third plurality of currents to the plurality of magnetic coils that changes the magnetic field when the plasma transitions from the second state to a third state in which the plasma has more energy than in the second state and begins expanding beyond at least the second length, wherein the third plurality of currents are selected to create a magnetic field that resists expansion of the radius of the separatrix from the second radial value over at least a portion of the length of the separatrix while the length of the separatrix increases beyond the second length value.

Some implementations relate to a magnetic field system. The system may include a container, a plurality of magnetic coils arranged to produce a magnetic field within the container, one or more supply circuits coupled to each of the plurality of magnetic coils, and circuitry to control delivery of current to the plurality of magnetic coils. The circuitry can be configured to: apply a first plurality of currents to the plurality of magnetic coils to create the magnetic field within the container that prepares the plasma in a first state, wherein a radius of a separatrix of the plasma in the first state has a first radial value and a length of the separatrix has a first length value when the plasma is in the first state; apply a second plurality of currents to the plurality of magnetic coils that changes the magnetic field to transition the plasma from the first state to a second state, wherein the radius of the separatrix has a second radial value in the second state of the plasma that is less than the first radial value and the separatrix has a second length value in the second state; and apply a third plurality of currents to the plurality of magnetic coils that changes the magnetic field when the plasma transitions from the second state to a third state in which the plasma has more energy than in the second state and begins expanding beyond at least the second length, wherein the third plurality of currents are selected to create a magnetic field that resists expansion of the radius of the separatrix from the second radial value over at least a portion of the length of the separatrix while the length of the separatrix increases beyond the second length value.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar components).

Figure 1:
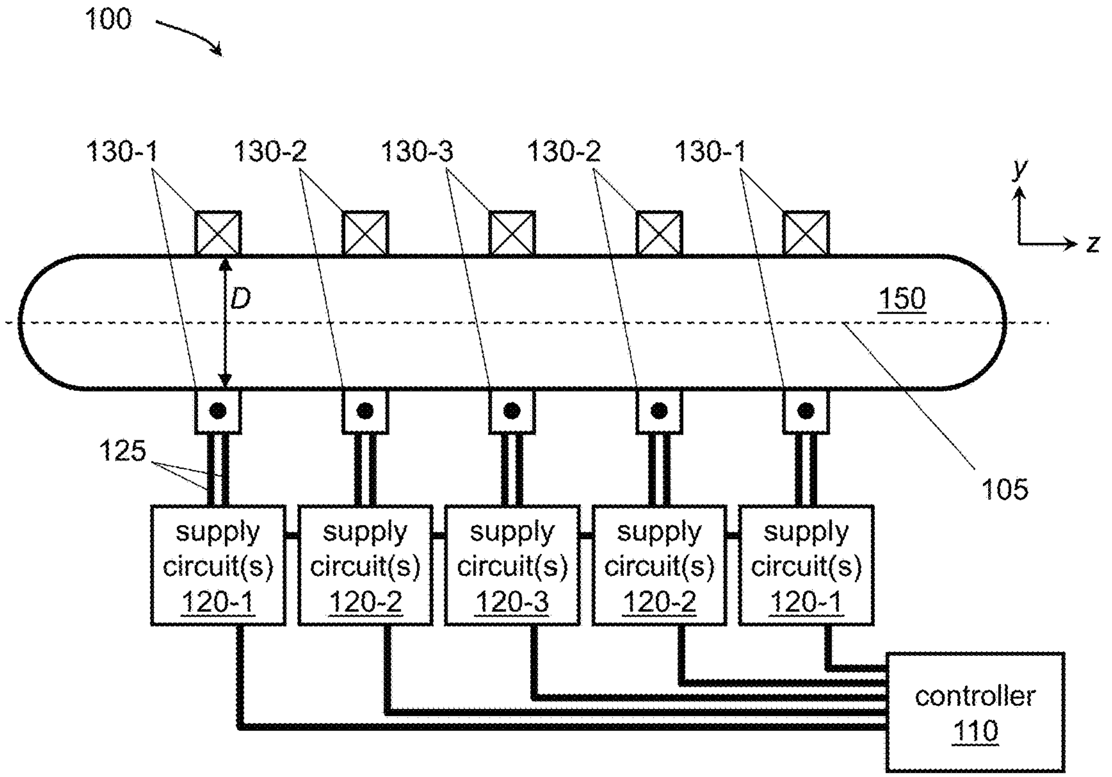
FIG. 1 depicts an example of a magnetic field system for producing intense magnetic fields.
Figure 4A:
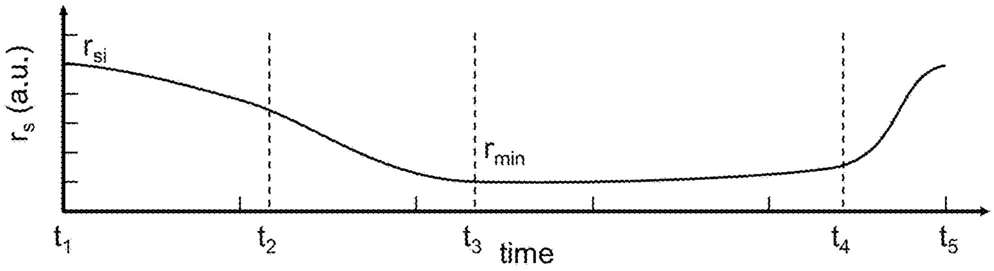
FIG. 4A illustrates an example of the plasma's separatrix radius as a function of time during an operational cycle of the magnetic field system of FIG. 1.
Figure 4B:
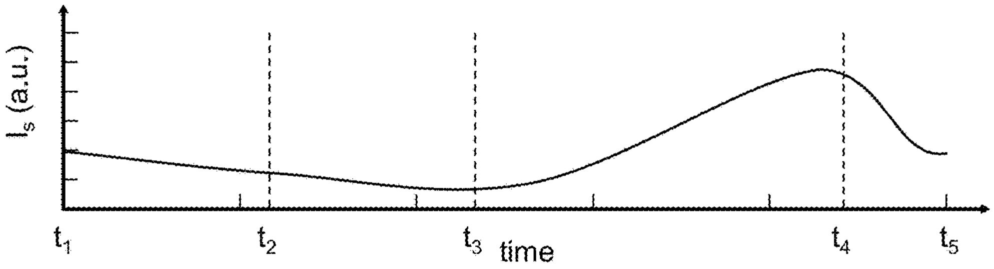
FIG. 4B illustrates an example of the separatrix length as a function of time during an operational cycle of the magnetic field system of FIG. 1.
Figure 4C:
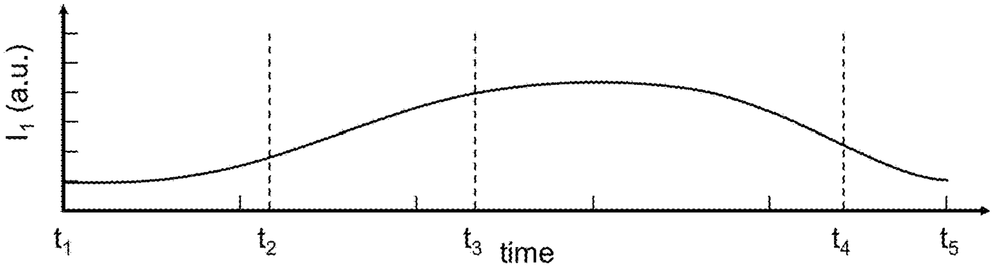

FIG. 4C plots an example of a current pulse applied to the end coils 130-1 of the magnetic field system of FIG. 1.

Figure 4D:
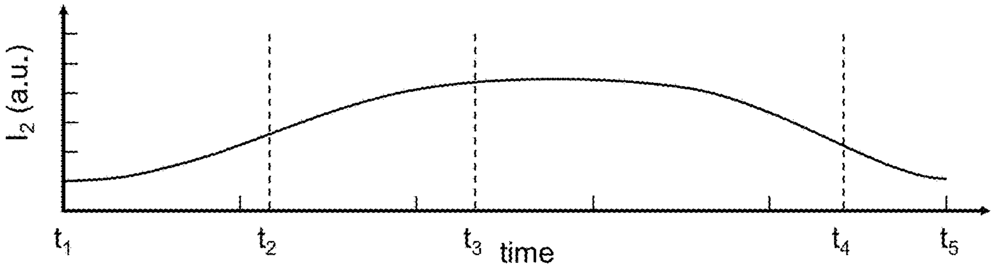

FIG. 4D plots an example of a current pulse applied to mid coils 130-2 of the magnetic field system of FIG. 1.

Figure 4E:
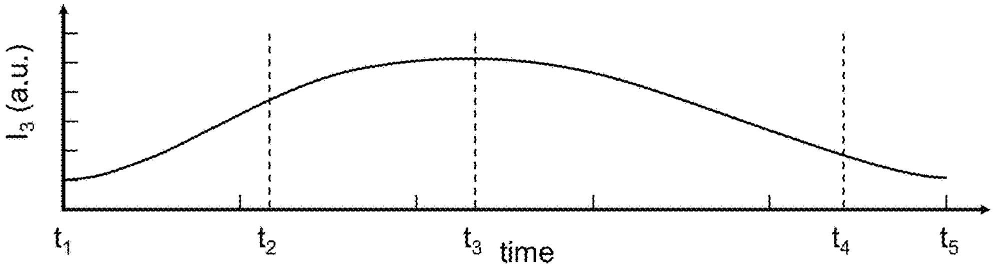

FIG. 4E plots an example of a current pulse applied to the central coil 130-3 of the magnetic field system of FIG. 1.

DETAILED DESCRIPTION

FIG. 1 depicts an example of a magnetic field system 100 that can be used to produce intense, dynamic magnetic fields (e.g., peak field values between 0.01 Tesla (T) and 50 T). The system 100 includes a plurality of magnetic coils 130-1, 130-2, 130-3 that are arranged to cooperatively produce a magnetic field within a container 150. To cooperatively produce a magnetic field, the magnetic coils 130 are spaced near enough to each other so that the magnetic field produced by any one coil adds to the magnetic field produced in the container 150 by at least one other coil in the system. For example, the space between adjacent coils 130-2, 130-3 can be equal to or less than the inner diameter D of the coil. The magnetic coils 130 can produce intense magnetic fields within the container 150 that is located adjacent to the magnetic coils 130. In the illustration, the container 150 and magnetic coils 130 are depicted in a cross-sectional view.

For some applications (particle or object acceleration), the container 150 may be a tube with at least one open end or can be formed in a loop. For other applications (plasma physics), the container 150 may be part of a larger a vacuum chamber with at least one entry port to introduce a plasma, for example. In such cases, the container may be made from stainless steel and/or other vacuum-compatible materials. In some cases, the container 150 can be a linear tube with entry ports at each end of the tube to inject plasmas from each end of the tube that are accelerated towards each other and collide at a center of the container. The collision can include a controlled merging of the injected plasmas, such that the resulting merged plasma maintains the same general structure of the injected plasmas. In other applications (e.g., magnetic levitation of vehicles), the container may take the form of a track.

The magnetic coils may comprise multi-turn windings in some cases. In other cases, the magnetic coils may be formed as single-turn or multi-fed, fractional-turn magnetic coils. A single-turn or fractional-turn coil may comprise a solid, conductive, or superconducting core. An inner diameter of the coils (enclosing a space in which an intense magnetic field is produced) can be between 1 centimeter (cm) and 300 cm. Examples of such coils are described in U.S. Patent Application Ser. No. 63/210,416 titled, "Inertially-Damped Segmented Coils for Generating High Magnetic Fields" filed Jun. 14, 2021, which application is incorporated herein by reference in its entirety.

Each of the magnetic coils 130 may be fed with electrical current from one or more supply circuits 120-1, 120-2, 120-3 (only one supply circuit is shown for each magnetic coil to simplify the illustration). The current may be provided over one or more supply lines 125 connected to each coil. The peak amount of current delivered to each coil can be, for example, between 100,000 amps (A) and 200,000,000 A.

Each of the supply circuits 120 (explained in more detail with reference to FIG. 2 below) can include an electrical source (e.g., a voltage source), at least one energy-storage component (such as a capacitor), and at least one switch that gates the flow of current from the at least one energy-storage component to the associated magnetic coil. The switch(es) in each supply circuit may be controlled independently of the switch(es) in other supply circuits 120 in the system (e.g., by a controller 110). As such, the current waveform and timing of the waveform delivered to each of the magnetic coils 130 can be controlled independently, to a significant extent, of the current delivered to other magnetic coils 130 in the system 100. In some cases, structural limitations of the magnetic-field system 100 may limit the amount of variation in amplitude, waveform, and/or timing between two or more of the magnetic coils 130.

A controller 110 can communicate with at least one of the supply circuits 120 to control at least the delivery of current from at least one supply circuit to one or more of the magnetic coils 130 (e.g., by activating the supply circuit's switch(es)). In some implementations, the controller 110 may additionally control an amount of current delivered by a supply circuit. In some cases, the controller can further control a waveform of the current delivered (e.g., by selecting capacitive and/or resistive components in the supply circuits 120). The controller 110 may comprise a computer in some cases. In other cases, the controller may comprise a field-programmable gate array, a programmable logic circuit, an application-specific integrated circuit, a digital signal processor, or some combination thereof.

In some cases, the control of current delivery to the magnetic coils may be distributed among the supply circuits or among firing-control circuits coupled to the supply circuits. For example, the controller 110 may issue a command signal to deliver current to a first coil 130-1. The command signal may be received by the first and/or a second supply circuit 120-1, or the command signal may be received by a firing-control circuit coupled to the first supply circuit and/or second supply circuit. Upon firing of the first coil 130-1, the first supply circuit 120-1 or firing-control circuit may issue a firing command signal to the next supply circuit 120-2 or a firing-control circuit coupled to the second supply circuit. In this manner, all magnetic coils can be fired, and the firing cycle can be repeated. In some implementations, there can be one or more predetermined delays between the firing of the supply circuits 120 to energize their associated magnetic coils 130 in a successive firing order. For example, the magnetic coils 130-1 near the ends of the coil assembly may be energized first by their associated supply circuits 120-1, and then the firing of supply circuits progresses inward such that the central coil(s) 130-3 is (are) energized last in the succession. The delayed timing may be electronically programmable by the controller 110 or firing-control circuits in some cases. In some implementations, the delayed timing may be engineered with circuit delay elements connected to the supply circuits 120 that delay successive firing command signals after an initial firing command signal is provided to at least one of the supply circuits.

Regardless of how the timing of firing is determined, independent control (at least to some extent) of energizing each of the magnetic coils 130 is possible with the magnetic field system 100 of FIG. 1. With such independent control of the amplitude, waveform, and timing of current delivered to each of the magnetic coils 130, dynamic and pulsating, intense magnetic fields can be produced in the container 150. Firing command signals can be provided to the magnetic coils 130 in fast succession using fiberoptic cables and high-speed switches. In some cases, adjacent coils may fire within 10 nanoseconds of each other. Such rapid sequencing of firing command signals can allow careful control of the plasma through the magnetic coils to form, maintain, and transition the plasma between different states. Example circuits for controlling firing of supply circuits are described in U.S. Patent Application Ser. No. 63/209,799, titled "High-Speed Switching Apparatus for Electromagnetic Coils," filed Jun. 11, 2022, which application is incorporated herein by reference in its entirety.

Figure 2:
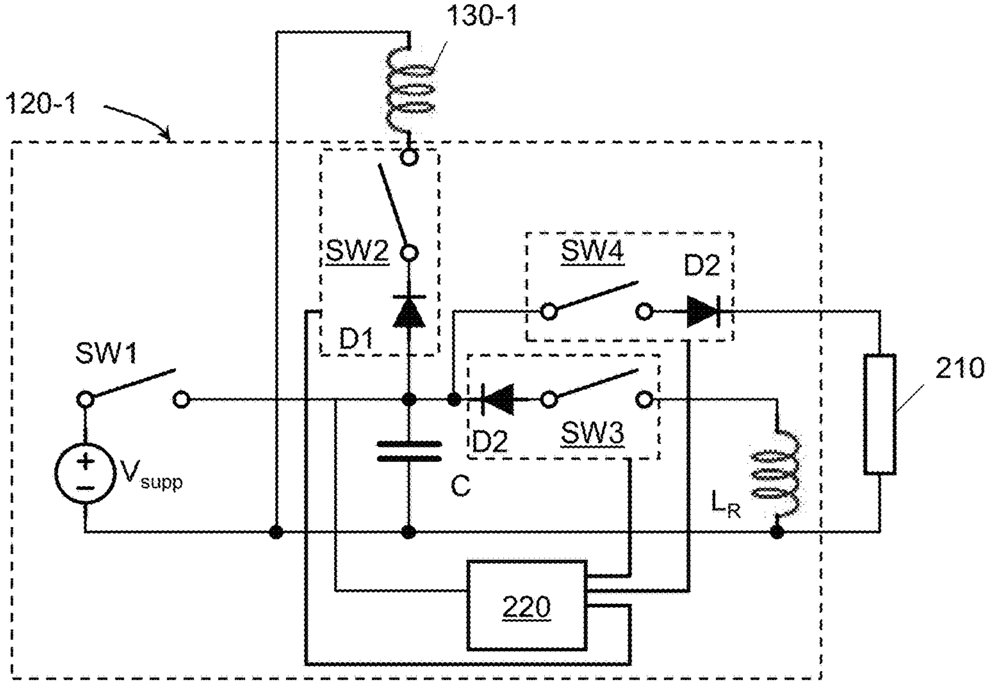
FIG. 2 depicts an example of a supply circuit for delivering current to, recovering, and harvesting energy from a magnetic coil in the system of FIG. 1.

FIG. 2 depicts one example of a supply circuit 120-1 that may be used to deliver current to, and receive current from, a magnetic coil 130-1 of the magnetic field system 100 of FIG. 1. The circuit includes an energy-storage component (modeled as a capacitor C), a source (modeled as a voltage supply $V_{supp}$), directional switches SW1, SW2, SW3, SW4, and diodes D1, D2. The directional switches may comprise silicon-controlled rectifiers (SCRs), for example, though other switches may be used. In operation, switch SW1 may be closed (with switches SW2, SW3, and SW4 open) to provide an initial charge to the energy-storage component C, which may be one or more capacitors. Switch SW1 may then open and switch SW2 close to deliver a pulse of current to the magnetic coil 130-1 (modeled as an inductor). Unused energy from the pulse and/or excess electrical energy produced from the magnetic coil 130-1 may pass through and accumulate charge in the capacitor C. When a peak charge has accumulated in the capacitor C which may be sensed by a sense and control circuit 220, switch SW2 may be opened and switch SW3 closed to recover energy through a recovery circuit branch that includes another energy-storage component (inductor $L_R$ in this example) and recharge the capacitor C. The sense and control circuit 220 can include a voltage sensor to detect a voltage on the charging node of the energy-storage component C and logic circuitry to output control signals to one or more of the switches SW2, SW3, SW4. If excess energy is produced and received from the magnetic coil (which may be detected by the sense and control circuit 220 as an overvoltage at the energy-storage component, switch SW4 can be closed to provide the excess energy to an external load 210. The external load may include a power conditioner to convert the output power into waveforms suitable for power applications (such as conventional two-phase or three-phase alternating current waveforms). In some implementations, the load 210 can comprise a power grid. Other supply circuits 120-1 are also possible, and example supply circuits can be found in U.S. Provisional Patent Application Ser. No. 63/196,469 titled, "Energy Recovery in Electrical Systems" filed Jun. 3, 2021 or in a non-provisional application bearing the same title filed on Jun. 3, 2022, which applications are incorporated by reference herein in their entirety.

FIG. 3A, FIG. 3B, FIG. 3C, FIG. 3D, and FIG. 3E depict simplified time-sequenced images of example magnetic field lines B (dashed lines) and configurations of a contained plasma 310 for the magnetic field system 100 of FIG. 1. The illustrations depict one example implementation in which a pulsating, intense magnetic field may be used to impart and extract energy directly from the plasma 310. To simplify the drawings, the container 150, supply circuits 120, and controller 110 have been omitted and only the magnetic coil assembly 300 is shown. Magnetic field lines B are depicted rudimentarily with dashed lines and a spatial extent of the plasma 310 is depicted rudimentarily with a solid line (which may be the location of the separatrix for the plasma, for example). The separatrix is the location of the last closed magnetic field line within the plasma 310. Cross-sectional views are shown for the magnetic coil assembly 300 and plasma 310 though the coil assembly and plasma are three-dimensional. For example, the magnetic coils 130 and plasma 310 are symmetric with respect to a central axis 305 through the container. Although only five coils are shown in the illustrations, there can be 10 to 100 coils or more in a magnetic field system 100. Further, the illustrations may be for only a central portion of the magnetic field system. There can be additional coils at each end of the system to form and inject plasmas from each end toward the center of the magnetic field system where the plasmas merge.

Figure 3A:
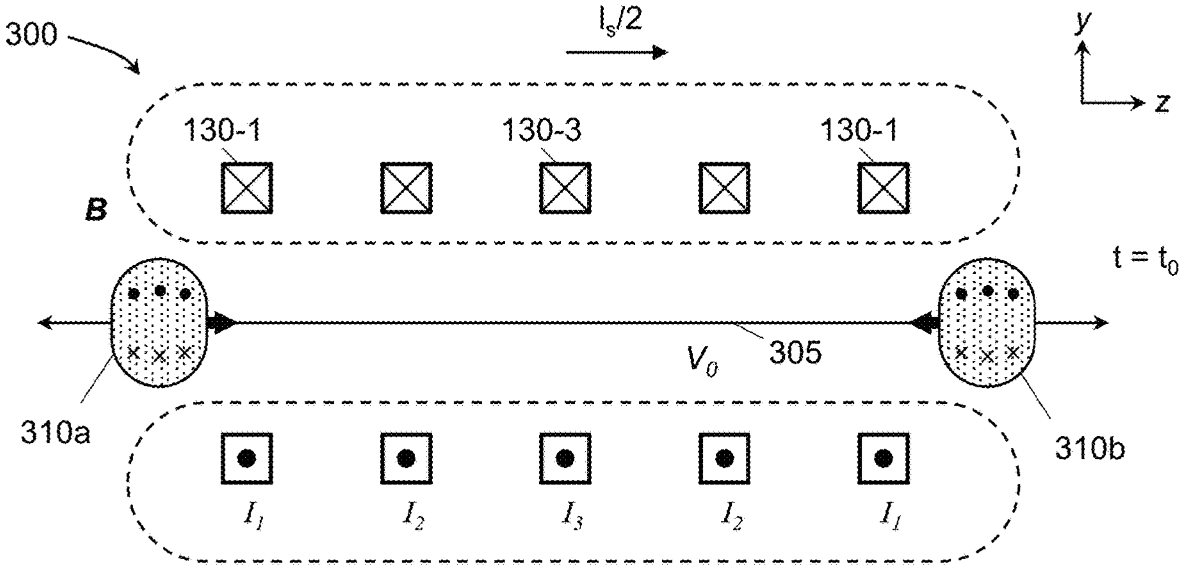
FIG. 3A depicts a magnetic field and plasma injection during an operational cycle of the system of FIG. 1.
Figure 3B:
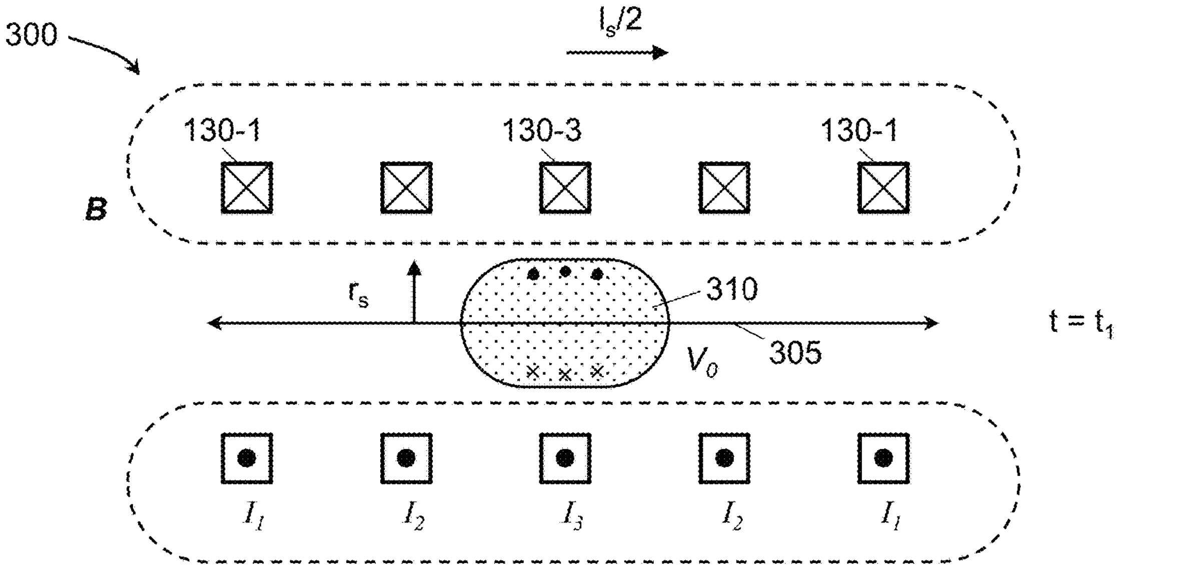
FIG. 3B depicts a magnetic field and plasma configuration at a first time during an operational cycle of the system of FIG. 1.

To start an operational cycle for some implementations, two or more plasmoids 310*a*, 310*b* can be injected into the magnetic coil assembly 300, as depicted in FIG. 3A. The plasmoids 310*a*, 310*b* can be formed in end regions of the magnetic coil assembly 300 and then accelerated toward each other using the magnetic coils 130. The plasmoids can merge within the magnetic coil assembly's container 150, forming a single plasma 310, rudimentarily depicted in FIG. 3B. The merging of plasmoids can add heat to the plasma 310. The plasma 310 may attain a first state in which the plasma is stable and has a separatrix radius $r_s$ and an axial length $l_s$ (in the ±z directions).

At a first time $t=t_1$, the magnetic field system 100 may be placed in an initial or first state for the operational cycle. Currents $I_1$, $I_2$, $I_3$ can be applied to the system's magnetic coils 130 to produce a magnetic field B that contains the plasma 310 to a first spatial extent. The plasma(s) may have a toroidal shape and be a field-reversed configuration (FRC) plasma. For example, the plasma can be mostly or fully ionized with fully magnetized electrons and likely further include magnetized ions. Further, the plasma can have significant diamagnetic currents and a plasma beta value β greater than or equal to 30%. The beta value is a ratio of pressure of the plasma, given by Eq. 2, to the magnetic pressure on the plasma, given by Eq. 1 below, averaged over the plasma's surface. The amounts of currents $I_1$, $I_2$, $I_3$ at time $t_1$ may be approximately equal for the initial state or increase slightly with distance from the center of the container to confine the plasma to the center of the container 150 and coil assembly 300. Because of the applied currents to the magnetic coils 130, an azimuthal current (indicated by the dots and crosses) that circulates around the plasma can be maintained in the container 150. In this initial state, the separatrix of the plasma may have an initial radius $r_s$ normal to the axis 305 and a half-length $l_s/2$ in a direction along the axis 305. There can be an initial volume $V_o$ of the plasma within the separatrix.

Figure 3C:
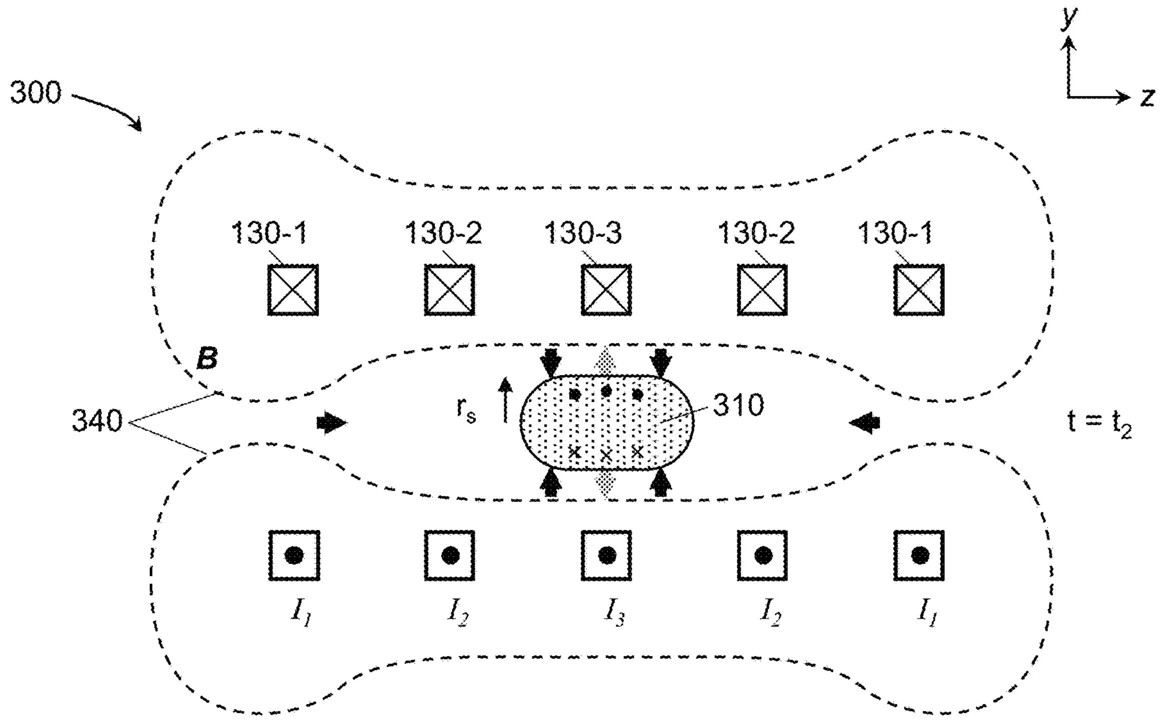
FIG. 3C depicts a magnetic field and plasma configuration at a second time during an operational cycle of the system of FIG. 1.

Subsequently, currents delivered to the magnetic coils 130 are increased to impart energy to the plasma 310 and transition the plasma from the initial state to a second state. At a second time $t=t_2$ at which the second state occurs, the volume of the plasma can be reduced compared to the volume of the plasma in the first state. FIG. 3C rudimentarily depicts the reduction of the plasma's volume. The increasing currents $I_1$, $I_2$, $I_3$ increase the strength of the magnetic field B which increases the magnetic pressure on the plasma 310 forcing the plasma radially inward and decreasing the volume of the plasma and increasing the plasma's internal temperature and pressure. The increased magnetic pressure is depicted as broad black arrows in the drawing pointing toward the top and bottom of the page. This increased pressure is exerted primarily radially around the circumference of the plasma. There can also be pressure exerted on the ends of the plasma reducing its length. The local magnetic pressure $P_B$ acting on the plasma can be expressed as $$P_B=B^2/2\mu_o \tag{1}$$

where B is the local scalar magnitude of the magnetic field B and $\mu_o$ is the magnetic permeability of free space.

To further confine the plasma, the current applied to the magnetic coils 130 may be applied differently for each coil and in a time-sequenced manner. For example, the initial increase in the current $I_3$ applied to coils at the ends of the coil assembly (sometimes referred to as mirror coils) may be greater than the increase in current $I_1$ applied to coil(s) at the center of the coil assembly 300 initially to form magnetic field lobes 340 near the ends of the coil assembly, which are depicted in FIG. 3C. The dashed line roughly indicates a contour of equal magnetic field strength. The lobes 340 can exert magnetic pressure on the ends of the plasma to reduce its length.

Figure 3D:
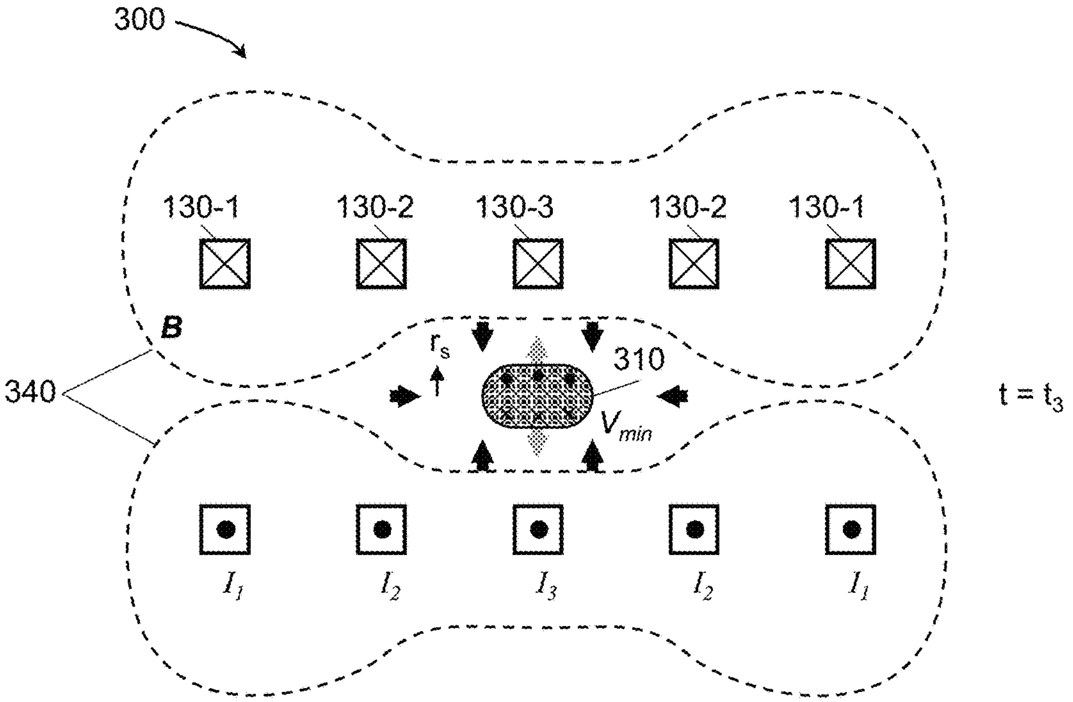
FIG. 3D depicts a magnetic field and plasma configuration at a third time during an operational cycle of the system of FIG. 1.

As depicted in FIG. 3D, these lobes 340 can be increased and/or propagated inward toward a center of the coil assembly 300 by sequencing a time-staggered increase in electrical currents applied to each adjacent coil in a direction moving toward a center of the coil assembly 300 (as described further in connection with FIG. 4C through FIG. 4E). For example, a peak increase in current $I_3$ can arrive at magnetic coils 130-1 before a peak increase in current $I_2$ arrives at magnetic coils 130-2. This time-sequenced application of current can increase the magnetic pressure acting axially on the plasma, as indicated by the broad black arrows directed left and right on the page in FIG. 3C and FIG. 3D. In response to the magnetic pressure, the plasma 310 exerts pressure back on the magnetic field which is indicated by the broad gray arrows in the drawing. The counteracting pressure within the plasma can be expressed as $$P=nk_BT \tag{2}$$

where n is a characteristic density value for the plasma (which may be one-half the peak density of the plasma), $k_B$ is Boltzmann's constant, and T is a peak temperature of the plasma.

As depicted in FIG. 3D, when the plasma 310 reaches a minimum volume $V_{min}$ at a time $t_3$, such that the magnetic coils can compress it no further, the plasma's energy may increase or be increased. For example, an internal reaction (chemical or nuclear) may occur or energy from another source (such as a high-power laser, particle beam, or microwave heating) may be imparted to the plasma 310. The rapid increase in plasma energy or production of energy by the plasma can represent another state of the plasma.

With the increased energy, the plasma 310 may begin expanding as it transitions to yet another state and energy may be liberated from the plasma and harvested by the magnetic coil assembly 300. In some cases, the expanding plasma and its azimuthal current impart a changing magnetic flux on the magnetic coils 130 and therefore induce electrical current flow in the magnetic coils 130. The induced electrical current from the plasma 310 may be recovered by the coils and used to recharge energy-storage components in at least some of the supply circuits 120. In some implementations, the induced current from the plasma may exceed the current delivered to the coils and be harvested from the system as useable energy. Such a harvesting of energy represents a direct coupling of energy from the plasma.

In addition, regardless of the plasma expansion, energy can be drawn from the plasma in other ways. For example, a working gas could be passed over and around the plasma to liberate heat. In other implementations, charged particles or neutrons could eject from the plasma and transfer energy to a receiving material (such as a photovoltaic energy recovery system for charged particles, or molten blanket for neutrons). In some implementations, the heat generated by the plasma when producing energy may be captured and converted to electrical energy (e.g., by creating steam and driving a steam turbine). Such conversion processes represent an indirect coupling of energy from the plasma 310.

Figure 3E:
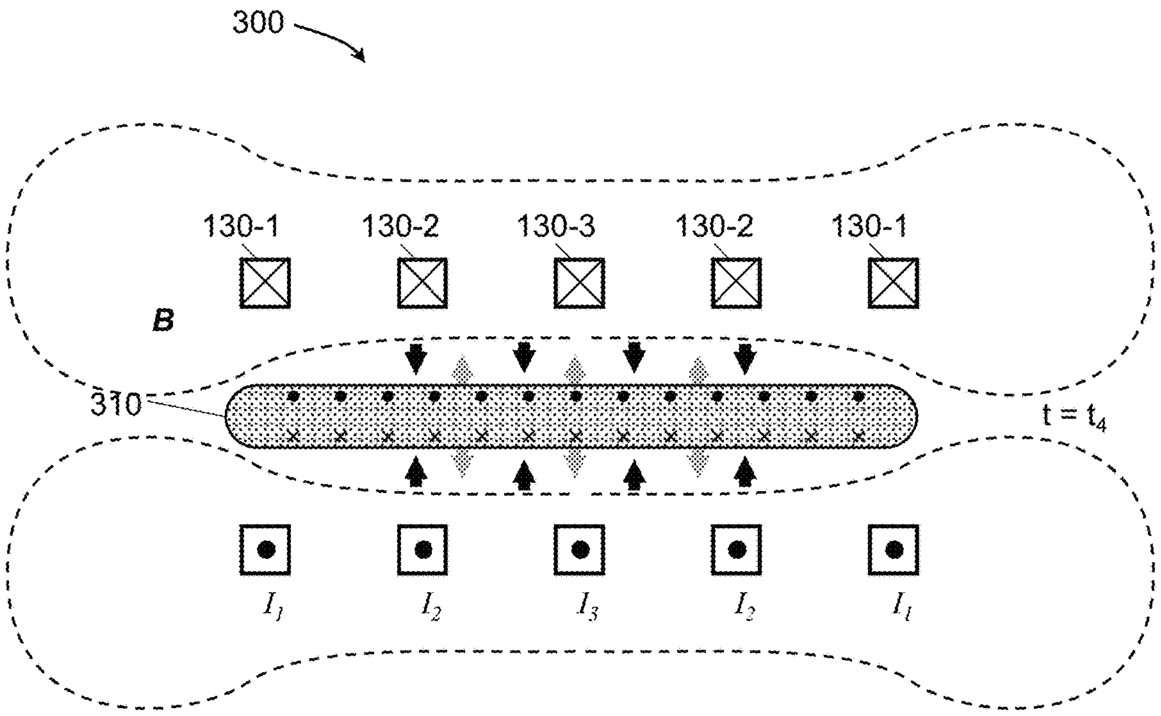
FIG. 3E depicts a magnetic field and plasma configuration at a fourth time during an operational cycle of the system of FIG. 1.

According to some implementations, the plasma 310 may be restricted in at least one dimension when it expands from a state at time $t_3$ to another state at a later time $t_4$, for which a configuration of the plasma is depicted rudimentarily in FIG. 3E. For example, the current applied to the central magnetic coil(s) 130-2, 130-3 may be controlled (e.g., with a feedback loop or by applying predetermined waveforms to the coils) to locally resist expansion of the separatrix radius or maintain a constant separatrix radius $r_s$ while the plasma 310 expands, or to allow $r_s$ to expand in a controlled manner. To maintain the constant separatrix radius, an increased or restraining current may be applied to at least a portion of the magnetic coils 130 (e.g., central coils 130-2, 130-3). In some cases, the current in a coil may be held using a crowbar across the coil supply lines. The crowbar may be within and activated by a supply circuit.

In a system with feedback control of the currents applied to the coils 130, voltage may be sensed on the magnetic coils to detect changes in the plasma's separatrix radius. Additionally or alternatively, diamagnetic probes and/or other magnetic sensors (such as sensing coil loops around the magnet coils) may be located at one or more positions along the axis of the container 150 to detect $r_s$ at one or more positions along the axis of the container 150. There can be multiple sensors at each position along the axis of the container 150. The sensed voltages and/or magnetic fields can be processed in a feedback loop to determine an amount of current to apply to each magnetic coil to control the separatrix radius $r_s$.

During an operational cycle between times $t_1$ and $t_3$, the increase in current values for at least one of the magnetic coils can be a factor having a value in a range from 1.5 to 10,000 (or any subrange within this range) from the initial current values at time $t_1$. The increase in magnitude of the magnetic field at a center of the container 150 may be by a factor having a value in a range from 1.5 to 10,000 (or any subrange within this range) and the reduction in plasma volume may be by a factor having a value in a range from 10 to 1,000 (or any subrange within this range) during the time interval from $t_1$ to $t_3$. The radius of the plasma's separatrix may decrease by a factor having a value in a range from 1.5 to 20 (or any subrange within this range, e.g., from 1.5 to 5) compared to an initial value $r_{si}$ before the currents were increased. An initial value of $r_{si}$ may be between 1 cm and 100 cm. The length of the separatrix may decrease by a factor having a value in a range from 1.5 to 50 (or any subrange within this range) compared to an initial value of the length before the currents were increased to compress the plasma 310. An initial length of the separatrix may be between 5 cm and 5 m. The time interval from $t_1$ from $t_3$ can be a duration of time having a value in a range from 1 nanosecond to 100 milliseconds (or any subrange within this range).

By maintaining a constant separatrix radius (or allowing $r_s$ to expand controllably), the plasma 310 continues to be well coupled to the coil assembly 300. The plasma and its azimuthal current wall can then be allowed to expand primarily axially along the coil assembly 300 achieving a longest length at time $t_4$, as depicted in FIG. 3E. As the plasma expands axially, the currents in the magnetic coils 130 may be controlled in sequence to maintain a fixed and approximately equivalent separatrix radius $r_s$ along at least a central portion of the coil assembly 300. In some cases, the radius $r_s$ may be allowed to expand in a controllable manner. The axial flux of plasma current and associated magnetic field can generate current(s) in one or more end magnetic coils of the coil assembly 300 or in one or more auxiliary magnetic coils distributed along the container 150. The generated current(s) can be harvested as usable energy. Such a method of harvesting energy represents a direct coupling of energy from the plasma.

After time $t_4$, the plasma 310 may have imparted an amount of energy to the coil assembly and cooled to the extent that it can no longer provide usable energy and/or maintain its expanded volume. In some cases, the plasma 310 may then start contracting back to the initial state depicted in FIG. 3B. The currents to the magnetic coils may be adjusted such that the plasma returns to the initial state for a next operational cycle.

Figure 3F:
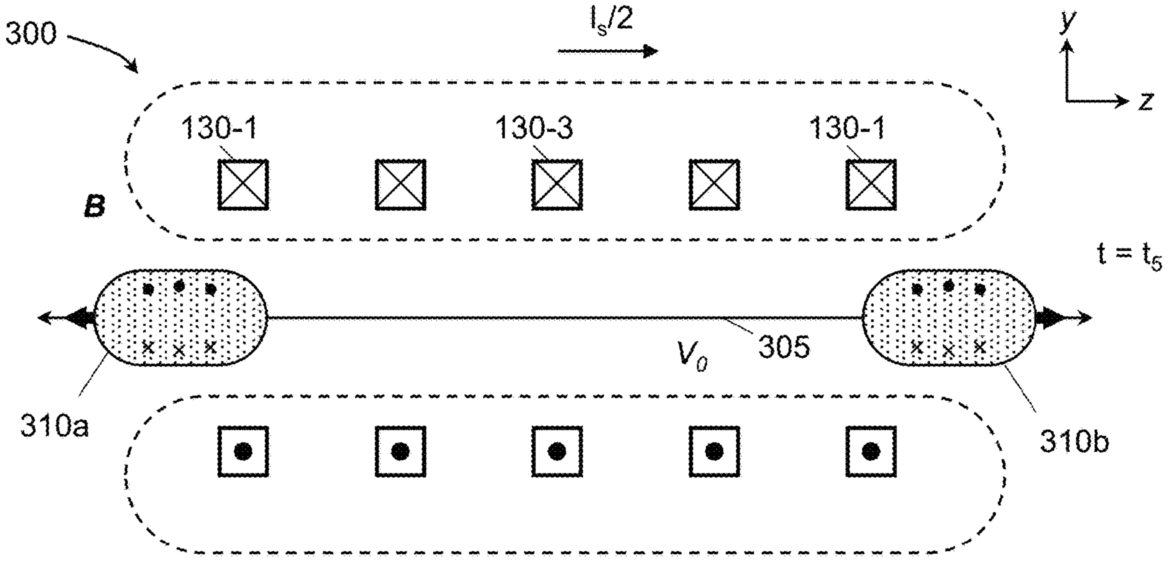
FIG. 3F depicts ejection of plasma during an operational cycle of the system of FIG. 1.

In some cases, as depicted in FIG. 3F, the plasma 310 may collapse at its center after the time $t_4$, such that it forms two separated plasmas at opposing ends of the magnetic field assembly 100. At least some of the plasma may be evacuated from the container 150 at this time to remove products of the reaction. The plasma may be ejected from the container 150 in ways different from the illustration of FIG. 3F. For example, the plasma may be ejected out one end of the container by reducing or removing magnetic fields on that side of the container. Ejecting the plasma from one side of the container potentially may be used for propulsion in a spacecraft, for example.

New plasma may be injected with each cycle (e.g., after time $t_4$) to replenish the supply of components that can react when the plasma is compressed on the next cycle. Removal and injection of plasma can be controlled by one or more magnetic coils located at the ends of the magnetic field assembly 100. The steps of plasma injection, compression, constrained expansion, and removal of products may then be repeated cyclically during operation of the magnetic field system 100.

Plasma configurations in addition to or other than the states described above may be attained in some implementations of the system. For example, in the third state the axial expansion of the plasma may be asymmetric and the plasma could even be ejected in one direction (for example, to create a propulsive effect). In some cases, the plasma may oscillate between different states one or more times during an operational cycle (e.g., oscillate between the plasma state at t=1 depicted in FIG. 3C and the plasma state at t=2 depicted in FIG. 3D one or more times).

In some implementations, the supply circuits 120 may be used to harvest electrical energy from the magnetic coils 130 during plasma expansion. For example, excess electrical current may be stored in the energy-storage component(s) of the power supplies and or additional energy-storage components that can be switched into connection with the magnetic coils (e.g., as a load 210 that may be connected to receive energy from a coil as described in connection with FIG. 2). A load 210 can be any device that consumes or stores electrical energy, including a power grid. At least some of the stored energy may be dumped to an external load in an interval of the operational cycle (e.g., when the plasma contracts from a fully expanded volume to an initial-state volume $V_o$). Some of the stored energy may be retained for a next operational cycle of the magnetic field system.

FIG. 4A through FIG. 4E plot example dynamics of plasma and current characteristics for an operational cycle of the magnetic field system of FIG. 1, according to some implementations. For this example, the separatrix radius $r_s$ of the plasma may evolve in time, for at least a portion of a compression/expansion cycle, as depicted in FIG. 4A. The separatrix radius $r_s$ may start the operational cycle at time $t_0$ with an initial radius $r_{si}$ and be reduced by the increasingly intense magnetic fields to a minimum radius $r_{min}$ at time $t_3$. Then for some cases, the separatrix radius may be held approximately constant (to within 10% or to within 20% of $r_{min}$) between the times $t_3$ and $t_4$ as the length of the separatrix $l_s$ is allowed to expand within the magnetic field system 100, as illustrated further with FIG. 4B. To maintain an approximately constant radius $r_s$, the local magnetic pressure $P_B$ acting radially on sidewalls of the plasma approximately equals the local plasma pressure P acting radially outward. Alternatively, holding $r_s$ approximately constant can be expressed as maintaining a beta β for the plasma's sidewalls to be approximately equal to 1, where $\beta=P/P_B$. In some cases, the separatrix radius may be controlled in a manner to allow some expansion of the separatrix radius (e.g., by as much as 50% during the time interval from $t_3$ to $t_4$). Such control of $r_s$ (whether restrained to be approximately constant or allowed to expand controllably) may be achieved by controlling the current waveforms applied to the magnetic coils 130 of the magnetic field system 100. At later stages of the operational cycle (after $t_4$), the separatrix's radius and length may return to an initial state as the current pulses applied to at least a portion of the magnetic coils 130 fall and return to initial values for the start of a next operational cycle.

The duration of an operational cycle, as depicted in FIG. 4A through FIG. 4E, may be from approximately or exactly 1 microsecond to approximately or exactly 1,000 milliseconds (or any subrange within this range). However, shorter or longer durations may be possible in some implementations. In some cases, each operational cycle may further include a recovery interval (e.g., between time $t_4$ and the application of current pulses to the magnetic coils for the next operational cycle). The recovery interval may allow time for heat dissipation and/or reinitialization of system components (e.g., heat dissipation in the container 150, heat dissipation in and resetting of switches of supply circuits 120, recharging of energy-storage components in the supply circuits 120, removal of spent plasma, injection of new plasma, etc.).

FIG. 4C through FIG. 4E depict examples of current waveforms that may be applied to some magnetic coils 130 of the system of FIG. 1 to produce the dynamic behavior of $r_s$ and $l_s$ that is depicted in FIG. 4A and FIG. 4B, respectively. The shapes of the waveforms can determine the dynamic behavior of $r_s$ and $l_s$. The example waveforms indicate that during the time interval $t_0$ to $t_2$ a higher current arrives first at the end coils 130-1, then at the mid coils 130-2, and last at the central coil(s) 130-3. The waveforms during the time interval from $t_3$ to $t_4$ may be controlled in a way to restrain the separatrix radius $r_s$ to approximately its minimum value $r_{min}$ as described above, or to expand in a controlled manner as indicated in FIG. 4A. In some cases, controlled expansion of the separatrix radius $r_s$ may improve particle confinement time and stability of the plasma 310.

FIG. 4D depicts an example of the current waveforms applied to the mid coils 130-2. The current waveforms applied to the mid coils may be similar to the current waveform applied to the central coil(s) 130-3 during the time interval from $t_3$ to $t_4$, since the separatrix radius may also be restrained by the mid coils to an approximately constant value or allowed to expand controllably. FIG. 4E depicts an example of the current waveforms applied to the end coils 130-1. The current waveforms applied to the end coils may fall more quickly than the current waveforms applied to the mid coils and central coil(s) during the time interval from $t_3$ to $t_4$ to allow expansion of the plasma 310 in length and radius at the ends of the plasma 310. This faster reduction in current for the end coils may be beneficial to allow the expanding plasma 310 to drive more magnetic flux through the end coils of the magnetic field system 100 and generate more harvestable current.

It will be appreciated that the depictions of plasma configurations in FIG. 3A through FIG. 3F represents rudimentary illustrations of plasma configurations at snapshots in time and that the plasma may pass through these configurations quickly during an operational cycle of the system. Similarly, the waveforms of FIG. 4A through FIG. 4E rudimentarily indicate evolution of currents applied to magnetic coils 130 of the magnetic field system 100. At any snapshot in time, the plasma 310 can be said to be in a particular state having a certain size, configuration, and energy. Accordingly, the plasma 310 can pass quickly through many states during an operational cycle of the system 100.

The magnetic field system 100 and methods of operating the system can be implemented in different configurations, some examples of which are listed below.

(1) A method of confining an energetic plasma, the method comprising: injecting the plasma into a container; applying a first plurality of currents to a plurality of magnetic coils that are arranged to create a magnetic field within the container, wherein the magnetic field prepares the plasma in a first state, wherein a radius of a separatrix of the plasma in the first state has a first radial value and a length of the separatrix has a first length value when the plasma is in the first state; applying a second plurality of currents to the plurality of magnetic coils that changes the magnetic field to transition the plasma from the first state to a second state, wherein the radius of the separatrix has a second radial value in the second state that is less than the first radial value and the separatrix has a second length value in the second state; and applying a third plurality of currents to the plurality of magnetic coils that changes the magnetic field when the plasma transitions from the second state to a third state in which the plasma has more energy than in the second state and begins expanding beyond at least the second length, wherein the third plurality of currents are selected to create a magnetic field that resists expansion of the radius of the separatrix from the second radial value over at least a portion of the length of the separatrix while the length of the separatrix increases beyond the second length value.

(2) The method of (1), wherein the third plurality of currents are selected to restrain the radius of the separatrix to approximately the second radial value over the portion of the length of the separatrix while the length of the separatrix increases beyond the second length value.

(3) The method of (1) or (2), wherein the plasma has a toroidal shape in the first state and an average beta value of the plasma is at least 0.3, wherein beta is a ratio of pressure of the plasma to a magnetic pressure on the plasma and is averaged over the surface of the plasma to obtain the average beta value.

(4) The method of any one of (1) through (3), wherein the applying the second plurality of currents further comprises reducing the length of the separatrix from the first length value of the separatrix in the first state to the second length value in the second state.

(5) The method of any one of (1) through (4), wherein the applying the second plurality of currents further comprises increasing at least one current of the first plurality of currents by a factor having a value in a range from 1.5 to 10,000.

(6) The method of any one of (1) through (5), wherein the applying the second plurality of currents further comprises increasing the magnitude of the magnetic field at the center of the container by a factor having a value in a range from 1.5 to 10,000.

(7) The method of any one of (1) through (6), wherein the applying the second plurality of currents further comprises reducing the radius of the separatrix from the first radial value by a factor having a value in a range from 1.5 to 5.

(8) The method of any one of (1) through (7), wherein the applying the second plurality of currents further comprises reducing the length the separatrix from the first length value by a factor having a value in a range from 1.5 to 50.

(9) The method of any one of (1) through (8), wherein the applying the first plurality of currents and the applying the second plurality of currents both occur within a duration of time have a value in a range from 1 microsecond to 100 milliseconds.

(10) The method of any one of (1) through (9), further comprising receiving current in at least one of the plurality of magnetic coils that is induced by an increase in magnetic flux produced as the plasma transitions to the third state.

(11) The method of (10), further comprising providing the received current to an external load.

(12) The method of (10) or (11), further comprising repeating in a sequence of cycles the acts of injecting the plasma, applying the first plurality of currents, applying the second plurality of currents, applying the third plurality of currents, and receiving current, wherein the sequence cycles includes at least 100 cycles.

(13) The method of (12), wherein each cycle of the sequence cycles has a duration of time in a range from 1 microsecond to 1,000 milliseconds.

(14) A system comprising: a container; a plurality of magnetic coils arranged to produce a magnetic field within the container; one or more supply circuits coupled to each of the plurality of magnetic coils; and circuitry to control delivery of current to the plurality of magnetic coils, wherein the circuitry is configured to: apply a first plurality of currents to the plurality of magnetic coils to create the magnetic field within the container that prepares the plasma in a first state, wherein a radius of a separatrix of the plasma in the first state has a first radial value and a length of the separatrix has a first length value when the plasma is in the first state; apply a second plurality of currents to the plurality of magnetic coils that changes the magnetic field to transition the plasma from the first state to a second state, wherein the radius of the separatrix has a second radial value in the second state of the plasma that is less than the first radial value and the separatrix has a second length value in the second state; and apply a third plurality of currents to the plurality of magnetic coils that changes the magnetic field when the plasma transitions from the second state to a third state in which the plasma has more energy than in the second state and begins expanding beyond at least the second length, wherein the third plurality of currents are selected to create a magnetic field that resists expansion of the radius of the separatrix from the second radial value over at least a portion of the length of the separatrix while the length of the separatrix increases beyond the second length value.

(15) The system of configuration (14), wherein the plurality of magnetic coils each has a center arranged along a linear axis to form a field reversed configuration generator.

(16) The system of configuration (14) or (15), wherein applying the second plurality of currents further comprises increasing at least one current of the first plurality of currents by a factor having a value in a range from 1.5 to 10,000.

(17) The system of any one of configurations (14) through (16), wherein applying the second plurality of currents further comprises increasing the magnitude of the magnetic field at the center of the container by a factor having a value in a range from 1.5 to 10,000.

(18) The system of any one of configurations (14) through (17), wherein the acts of applying the first plurality of currents and applying the second plurality of currents occurs within a duration of time have a value in a range from 1 microsecond to 1,000 milliseconds.

(19) The system of any one of configurations (14) through (18), wherein the circuitry is further configured to cyclically repeat the sequence of applying the first plurality of currents, applying the second plurality of currents, and applying the third plurality of currents when operating the magnetic field system.

(20) The system of any one of configurations (14) through (19), wherein the circuitry comprises a controller communicatively coupled to each of the one or more supply circuits.

(21) The system of any one of configurations (14) through (19), wherein the circuitry comprises firing control circuitry configured to sequence the delivery of current to each of the plurality of magnetic coils in response to receiving a command signal to deliver current to a first magnetic coil of the plurality of magnetic coils.

(22) The system of configuration (21), wherein the firing control circuitry is distributed among the one or more supply circuits coupled to each of the plurality of magnetic coils.

(23) The system of any one of configurations (14) through (22), wherein each supply circuit of the one or more supply circuits comprises: a source to provide current; an energy-storage component to receive current from the source; and a first switch to deliver energy from the energy-storage component to a magnetic coil of the plurality of magnetic coils.

(24) The system of configuration (23), wherein each supply circuit of the one or more supply circuits further comprises a second switch to recover energy from the magnetic coil and recharge the energy-storage component.

(25) The system of configuration (23) or (24), wherein each supply circuit of the one or more supply circuits further comprises a third switch to provide current from the magnetic coil to an external load.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the components so conjoined, i.e., components that are conjunctively present in some cases and disjunctively present in other cases. Multiple components listed with "and/or" should be construed in the same fashion, i.e., "one or more" of the components so conjoined. Other components may optionally be present other than the components specifically identified by the "and/or" clause, whether related or unrelated to those components specifically identified. Thus, as a non-limiting example, a reference to "A and/or B", when used in conjunction with open-ended language such as "comprising" can refer, in one embodiment, to A only (optionally including components other than B); in another embodiment, to B only (optionally including components other than A); in yet another embodiment, to both A and B (optionally including other components); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of components, and, optionally, additional unlisted items. Only terms clearly indicated to the contrary, such as "only one of" or "exactly one of," or, when used in the claims, "consisting of," will refer to the inclusion of exactly one component of a number or list of components. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more components, should be understood to mean at least one component selected from any one or more of the components in the list of components, but not necessarily including at least one of each and every component specifically listed within the list of components and not excluding any combinations of components in the list of components. This definition also allows that components may optionally be present other than the components specifically identified within the list of components to which the phrase "at least one" refers, whether related or unrelated to those components specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including components other than B); in another embodiment, to at least one, optionally including more than one, B, with no A present (and optionally including components other than A); in yet another embodiment, to at least one, optionally including more than one, A, and at least one, optionally including more than one, B (and optionally including other components); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of confining a plasma, the method comprising:

injecting the plasma into a container;

applying a first plurality of currents to a plurality of magnetic coils that are arranged to create a magnetic field within the container, wherein the magnetic field prepares the plasma in a first state, wherein a radius of a separatrix of the plasma in the first state has a first radial value and a length of the separatrix has a first length value when the plasma is in the first state;

applying a second plurality of currents to the plurality of magnetic coils that changes the magnetic field to transition the plasma from the first state to a second state, wherein the radius of the separatrix has a second radial value in the second state that is less than the first radial value and the separatrix has a second length value in the second state; and applying a third plurality of currents to the plurality of magnetic coils that changes the magnetic field when the plasma transitions from the second state to a third state in which the plasma has more energy than in the second state and begins expanding beyond at least the second length value, wherein the third plurality of currents are selected to create a magnetic field that resists expansion of the radius of the separatrix from the second radial value over at least a portion of the length of the separatrix while the length of the separatrix increases beyond the second length value.

2. The method of claim 1, wherein the third plurality of currents are selected to restrain the radius of the separatrix to approximately the second radial value over the portion of the length of the separatrix while the length of the separatrix increases beyond the second length value.

3. The method of claim 1, wherein the plasma has a toroidal shape in the first state and an average beta value of the plasma is at least 0.3, wherein beta is a ratio of pressure of the plasma to a magnetic pressure on the plasma and is averaged over a surface of the plasma to obtain the average beta value.

4. The method of claim 1, wherein applying the second plurality of currents further comprises reducing the length of the separatrix from the first length value of the separatrix in the first state to the second length value in the second state.

5. The method of claim 1, wherein applying the second plurality of currents further comprises increasing at least one current of the first plurality of currents by a factor having a value in a range from 1.5 to 10,000.

6. The method of claim 1, wherein applying the second plurality of currents further comprises increasing a magnitude of the magnetic field at a center of the container by a factor having a value in a range from 1.5 to 10,000.

7. The method of claim 1, wherein applying the second plurality of currents further comprises reducing the radius of the separatrix from the first radial value by a factor having a value in a range from 1.5 to 5.

8. The method of claim 1, wherein applying the second plurality of currents further comprises reducing the length the separatrix from the first length value by a factor having a value in a range from 1.5 to 50.

9. The method of claim 1, wherein applying the first plurality of currents and applying the second plurality of currents both occur within a duration of time have a value in a range from 1 microsecond to 100 milliseconds.

10. The method of claim 1, further comprising:

receiving current in at least one of the plurality of magnetic coils that is induced by an increase in magnetic flux produced as the plasma transitions to the third state.

11. The method of claim 10, further comprising:

providing the current to an external load.

12. The method of claim 10, further comprising:

repeating in a sequence of cycles the acts of injecting the plasma, applying the first plurality of currents, applying the second plurality of currents, applying the third plurality of currents, and receiving current, wherein the sequence of cycles includes at least 100 cycles.

13. The method of claim 12, wherein each cycle of the sequence of cycles has a duration of time in a range from 1 microsecond to 1,000 milliseconds.

14. A system comprising:

a container to hold a plasma;

a plurality of magnetic coils arranged to produce a magnetic field within the container;

one or more supply circuits coupled to each of the plurality of magnetic coils; and circuitry to control delivery of current to the plurality of magnetic coils, wherein the circuitry is configured to:

apply a first plurality of currents to the plurality of magnetic coils to create the magnetic field within the container that prepares the plasma in a first state, wherein a radius of a separatrix of the plasma in the first state has a first radial value and a length of the separatrix has a first length value when the plasma is in the first state;

apply a second plurality of currents to the plurality of magnetic coils that changes the magnetic field to transition the plasma from the first state to a second state, wherein the radius of the separatrix has a second radial value in the second state of the plasma that is less than the first radial value and the separatrix has a second length value in the second state; and apply a third plurality of currents to the plurality of magnetic coils that changes the magnetic field when the plasma transitions from the second state to a third state in which the plasma has more energy than in the second state and begins expanding beyond at least the second length value, wherein the third plurality of currents are selected to create a magnetic field that resists expansion of the radius of the separatrix from the second radial value over at least a portion of the length of the separatrix while the length of the separatrix increases beyond the second length value.

15. The system of claim 14, wherein the plurality of magnetic coils each has a center arranged along a linear axis to form a field reversed configuration generator.

16. The system of claim 14, wherein the circuitry is further configured to apply the second plurality of currents by increasing at least one current of the first plurality of currents by a factor having a value in a range from 1.5 to 10,000.

17. The system of claim 14, wherein the circuitry is further configured to apply the second plurality of currents by increasing a magnitude of the magnetic field at a center of the container by a factor having a value in a range from 1.5 to 10,000.

18. The system of claim 14, wherein the circuitry is configured to apply the first plurality of currents and the second plurality of currents within a duration of time have a value in a range from 1 microsecond to 1,000 milliseconds.

19. The system of claim 14, wherein the circuitry is further configured to cyclically repeat a sequence of applying the first plurality of currents, applying the second plurality of currents, and applying the third plurality of currents.

20. The system of claim 14, wherein the circuitry comprises a controller communicatively coupled to each of the one or more supply circuits.

21. The system of claim 14, wherein the circuitry comprises firing control circuitry configured to sequence the delivery of current to each of the plurality of magnetic coils in response to receiving a command signal to deliver current to a first magnetic coil of the plurality of magnetic coils.

22. The system of claim 21, wherein the firing control circuitry is distributed among the one or more supply circuits coupled to each of the plurality of magnetic coils.

23. The system of claim 14, wherein each supply circuit of the one or more supply circuits comprises:

a source to provide current;

an energy-storage component to receive current from the source; and a first switch to deliver energy from the energy-storage component to a magnetic coil of the plurality of magnetic coils.

24. The system of claim 23, wherein each supply circuit of the one or more supply circuits further comprises a second switch to recover energy from the magnetic coil and recharge the energy-storage component.

25. The system of claim 23, wherein each supply circuit of the one or more supply circuits further comprises a third switch to provide current from the magnetic coil to an external load.

* * * * *